United States Patent [19]

Innes

[11] Patent Number: 4,586,735
[45] Date of Patent: May 6, 1986

[54] GASKETED PIPE UNION

[75] Inventor: Donn Innes, Shavertown, Pa.

[73] Assignee: Nicholson Division, Datron Systems, Inc., Wilkes-Barre, Pa.

[21] Appl. No.: 573,848

[22] Filed: Jan. 25, 1984

[51] Int. Cl.$^4$ ............................................. F16L 19/02
[52] U.S. Cl. .................................... 285/354; 285/379
[58] Field of Search ................... 285/379, 380, 354; 277/47, 105, 110

[56] References Cited

U.S. PATENT DOCUMENTS

| | | | |
|---|---|---|---|
| 800,390 | 9/1905 | O'Meara | 285/354 X |
| 857,956 | 6/1907 | Mueller | 285/379 X |
| 1,859,525 | 5/1932 | Oberhuber | 285/354 X |
| 2,691,536 | 10/1954 | Tamminga | 285/354 |
| 2,790,661 | 4/1957 | Tamminga | 285/354 X |
| 3,427,053 | 2/1969 | Dunlap et al. | 285/379 |
| 4,294,447 | 10/1981 | Ahlstone | 285/379 X |

FOREIGN PATENT DOCUMENTS

| | | | |
|---|---|---|---|
| 522560 | 11/1955 | Belgium | 285/379 |
| 268571 | 3/1964 | Netherlands | 285/354 |
| 783397 | 9/1957 | United Kingdom | 285/379 |

Primary Examiner—Dave W. Arola
Attorney, Agent, or Firm—Paul & Paul

[57] ABSTRACT

A gasketed pipe union has an annular connection stub on one section of pipe forced against a connection ring on a second section and held by a lock nut. A gasket and retaining and centering device, pressed between the stub and ring, insure a seal between the two sections.

1 Claim, 10 Drawing Figures

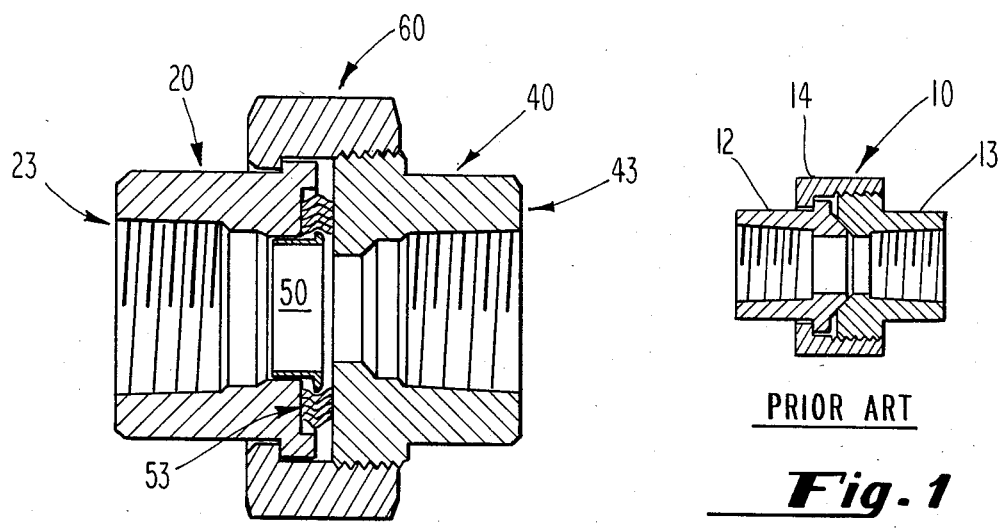
Fig. 1 PRIOR ART
Fig. 2
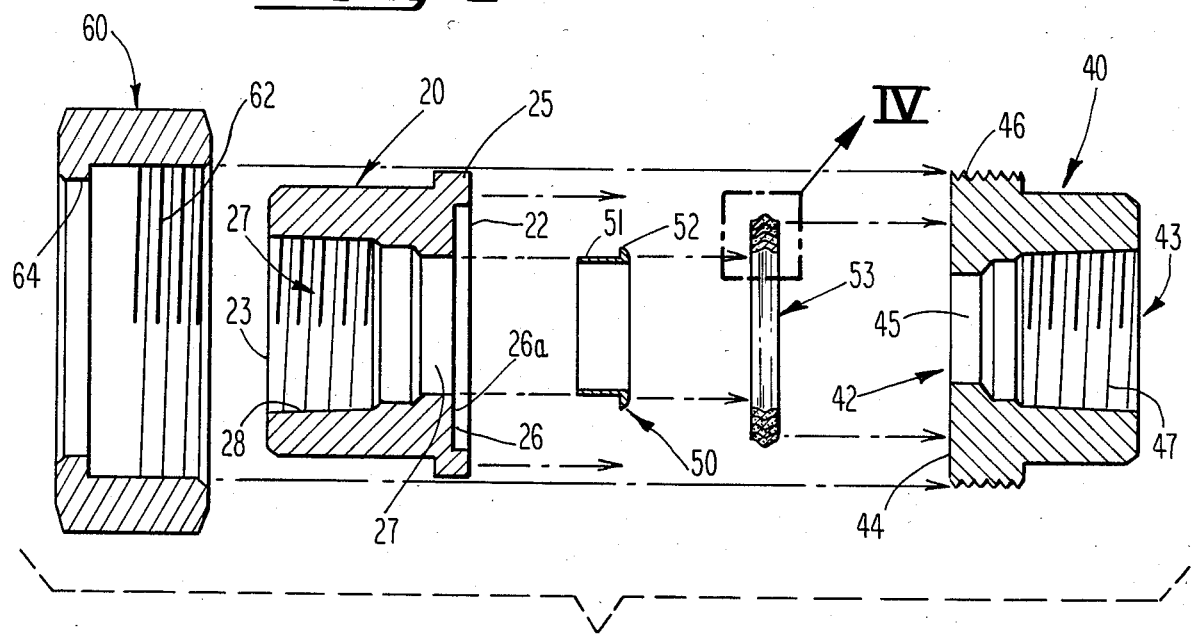
Fig. 3
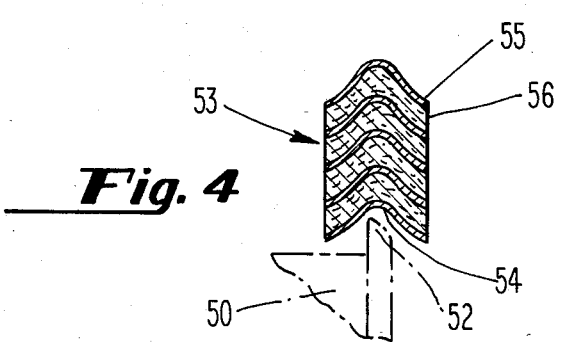
Fig. 4

4,586,735

GASKETED PIPE UNION

BACKGROUND OF THE INVENTION

1. Field of the Invention

This invention relates to sending steam under pressure, or other substances either under or not under pressure, through pipes across long distances. More particularly, this invention relates to the unions between the pipes and allows new pipes to be retrofitted to an existing system with more economy and efficiency than previously possible.

2. Description of the Prior Art

Long runs of piping that carry a substance under pressure have joints, or unions, that previously have required precise machining of both male and female components to insure an exact fit. Since these unions are typically made of steel or stainless steel, the machine grinding takes a skilled machinist, precision equipment and lots of time. All of this adds up to a high cost.

The section of pipe held between two opposing unions is forced into a taut, horizontal position because the carefully ground components are put together such that the male ground surface precisely fits next to the female ground surface. Removal of a section for repairs requires springing that section to allow space at either end. This can, and sometimes does, damage the costly union, as well as deform the section of pipe. In addition, normal vibration of a system over time tends to weaken the ground joint seal.

SUMMARY OF THE INVENTION

A gasketed pipe union is disclosed that allows quick and easy installation and removal of a section of pipe from a run of pipes. The union has a securable lock nut being internally threaded at one end and having a smaller diameter retaining ring at the other end concentrically and rotatably arranged around an annular connection stub. The connection stub has a bore therethrough with an internally threaded end for joining to a section of pipe and an arresting collar around the front end. The connection stub has a gasket cavity in the front end with a seating chamber co-axially disposed adjacent thereto. A connection ring having a bore therethrough with an internally threaded end for joining to a section of pipe and an externally threaded opposite pressure face opposes said stub. An annular centering and retaining device and annular gasket are matingly pressed into said chamber and cavity to form an hermetic seal at the union of the pipes as said lock nut threads engage and fixedly secure the external threads on said ring.

OBJECTS OF THE INVENTION

It is therefore an object of the present invention to provide a gasketed pipe union that allows quick and facile replacement of a section of pipe in a system of pipes.

It is a further object of the present invention to provide a gasketed pipe union that hermetically secures pipes carrying a variety of substances.

These and other objects of the invention will appear from the following specification, and are not to be construed as limiting the scope of the invention thereto, since in view of the disclosure herein others may be able to make additional embodiments within the scope of the appended claims.

BRIEF DESCRIPTION OF THE DRAWINGS

FIG. 1 is a cross-sectional view of the prior art pipe union;

FIG. 2 is a cross-sectional view of an embodiment of the present invention;

FIG. 3 is an exploded view of FIG. 2;

FIG. 4 is an enlarged fragmentary cross-sectional view of a portion of FIG. 3 taken at IV.

DESCRIPTION OF THE PREFERRED EMBODIMENT

Figure 5:
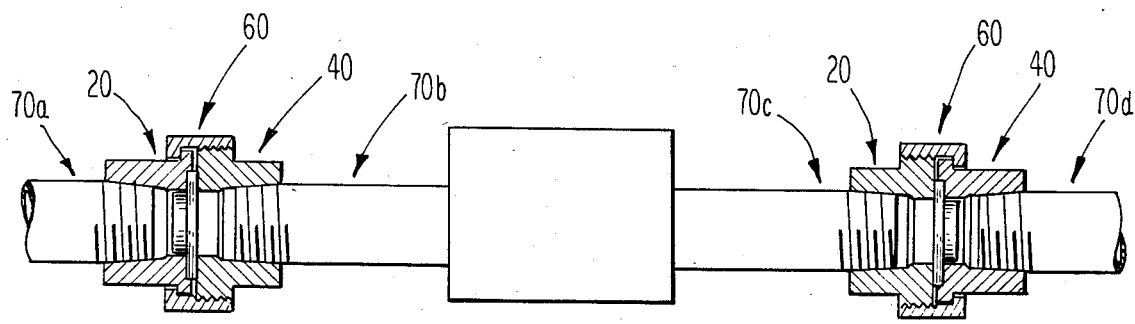
FIG. 5 is a cross-sectional view of a run of pipe showing the use of gasketed pipe unions connecting the opposite ends of a section of pipe in accordance with the present invention.

FIG. 1 shows a pipe union 10 as known and used in the prior art. Pipe union 10 has a male end 12 to be joined with a female end 13 and secured by a lock nut 14 that is co-axial and annular to the male and female ends. A section of tubular vessel, such as pipe, is joined to both male and female ends (not shown). FIG. 2 shows a cross-sectional view of the present invention. FIG. 3 is an exploded view of the invention as shown in FIG. 2 for closer inspection of individual parts. As shown in FIGS. 2 and 3, a connection stub 20 is circular-shaped and can be made of a variety of substances such as steel or stainless steel. Connection stub 20 has a front end 22 and a back end 23 and is internally helically threaded, as at 28, at back end 23 so as to join with a section of pipe (not shown). Affixed around front end 22 is an arresting collar 25 of predetermined size for a purpose to be described below. At the front end, inside arresting 25 collar is a first, shallow chamber, or gasket cavity 26. Gasket cavity 26 is adjacent a second, seating chamber 27 of a smaller predetermined dimension. Both chambers are co-axial with central bore 27 running the length of connection stub 20.

Opposing connection stub 20 is a connection ring 40. Connection ring 40 is also in the form to have a front end 42 and a back end 43 and back end 43 is internally threaded, as at 47, as is back end 23 of connection stub 20 to allow a pipe to be securely affixed thereto. A pressure face 44 exists at front end 42 opposing connection stub 20 with a central bore 45 therethrough to allow materials to pass from the connection stub 20 through connection ring 40. Pressure face 44 is flat and has helical threads 46 around the external surface adjacent thereto.

As shown in FIGS. 2 and 3, centering and sealing means 50 is employed between stub 20 and ring 40 so that the gasket material that ensures the hermetic seal at the union is properly positioned between the two components, 20 and 40. Centering and sealing means 50 can be manufactured by either of two methods: either forming individual and distinct elements and combining them to produce the overall effect, or producing a unitary piece to accomplish all required steps.

FIGS. 3 and 4 show how means 50 is constructed when individual elements are combined to accomplish the hermetic seal. Means 50, in a first configuration, comprises a thin-walled, hollow cylinder 51 of predetermined diameter having its one edge formed into a flange 52, and being removably joined at said flange to a sealing gasket 53. Cylinder 51 acts as a centering device to place gasket 53 perfectly into gasket cavity 26 by slipping into chamber 27 and as a holding device to prevent it from falling out and to retain means 50 in the exact place a workman has put it before the joint can be completed. The length of cylinder 51 from below flange 52 to the end thereof is predetermined to be the exact linear dimension of chamber 27 and there is a "slip-fit" between cylinder 51 and the inside diameter of chamber 27 such that flange 52 will overlap into cavity 26. Cylinder 51 is constructed of a rigid material as is known in the industry so as not to warp or deform under the pressures exerted when the union joins two pipes.

FIG. 4 shows an enlarged fragmentary cross-sectional portion of means 50 to depict the removable joining of flange 52 (in ghost) and gasket 53. As shown in FIG. 4, the gasket material is in layers as is produced when the gasket is spiral wound. In this form, a thin section of metal strip 55 is placed between each layer of gasket material 56 and each successive layer is constructed in an inverted "V" to form an indentation 54. Gasket 53 is formed so that flange 52 is securely seated in indentation 54 thereby forcing gasket 53 to be pressed into a predetermined area inside cavity 26.

Once means 50 is centered inside stub 20, gasket 53 becomes centered inside cavity 26 and rests against surface 26a around chamber 27 (as depicted by arrows showing movement between the components). A lock nut 60 as shown in FIGS. 2 and 3 fits over stub 20 and, through helical threads 62 on the front inside surface thereof, engages securing means, being external helical threads 46, on ring 40 in a known manner. As lock nut 60 is threaded onto ring 40, retaining ring 64, of a predetermined diameter in the inside of back end of lock nut 60, catches upon arresting means, such as collar 25, so as to force stub 20 and ring 40 into a tight union. Pressure face 44 forces gasket 53 to expand inside cavity 26, which expansion is facilitated by the inverted "V" shape thereof. Gasket 53 is constructed in a predetermined size by known techniques to expand in a sealing manner to cause the hermetic seal to form. Gasket 53 provides the necessary seal between pipes 70a and 70b that precludes the necessity of prior art ground joints.

Figure 7:
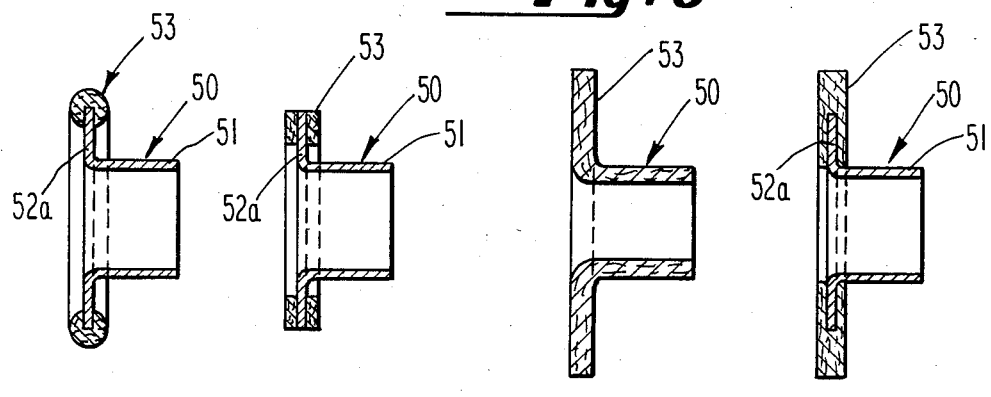
FIGS. 7 (a), (b), (c) and (d) show cross-sectional views of alternate forms of the gasket and centering element of the present invention.

An alternate mode of construction of means 50 is shown in FIG. 7. FIGS. 7a, b and d show means 50 as made by inserting long flange 52a into gasket 53. Flange 52a is rolled or formed into a 90° bend as shown and gasket 53 is pressed onto it or molded around the periphery thereof as is known in the art.

FIG. 7c shows means 50 constructed entirely of gasket material. In this embodiment, gasket 53 is formed into a hollow cylindrical shape that "slip-fits" into chamber 27 to prevent means so from falling out once it has been put in place. The remainder of gasket 53 is formed to make a 90° bend, as has been previously described, and additional gasket material 53 extends outward from the cylinder portion in the form of a long flange to complete the seal.

Figure 6:
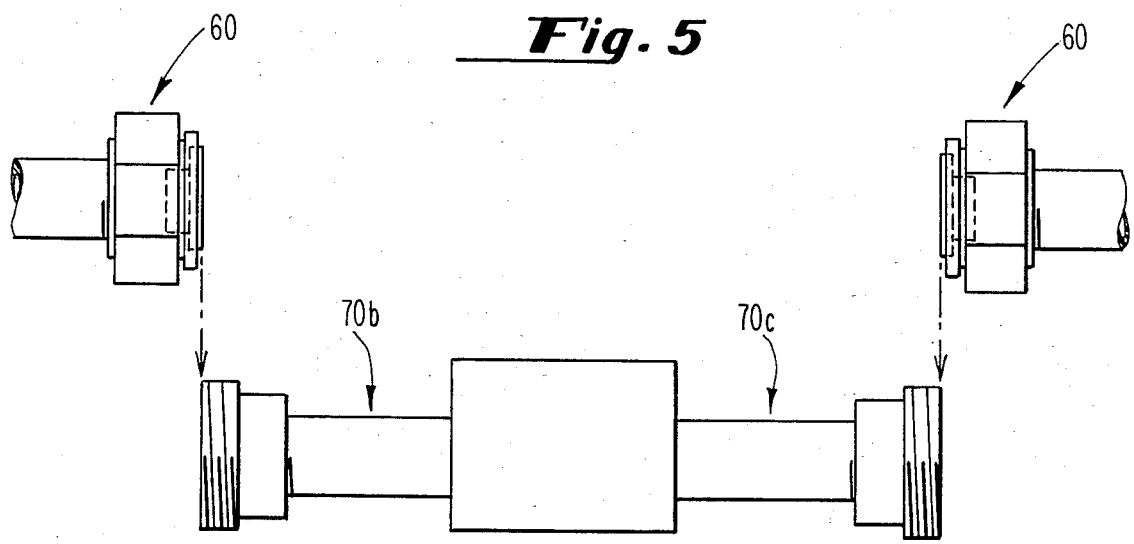
FIG. 6 is an elevation showing the section of pipe of FIG. 5 removed from the run of piping in accordance with the system of the present invention.

The procedure for installing the invention in a system of piping can be seen in FIGS. 5 and 6. FIG. 5 shows a cross-sectional view of sections of pipe 70a, b, c, d that form a system of piping with the current invention installed. In FIG. 6, lock nut 60 on both of the pipe unions has been unthreaded from the threads 46 of the connecting ring, thereby readily allowing the sections of pipe 70b and c to be removed by simply sliding vertically from the rest of the pipe system. As has been previously described, means 50 is now inserted into chamber 27 and threads 62 of nut 60 engage threads 46 to close the union and thereby join sections 70b and c to the system.

Obviously, many modifications and variations of the present invention are possible in light of the above teachings, and it is, therefore, understood that, within the scope of the disclosed inventive concept, the invention may be practiced otherwise than specifically described.

What is claimed is:

1. A system of rigid piping wherein individual sections of pipe are joined by a gasketed pipe union comprising:
   a. an annular connection stub having a coaxial bore therethrough with a front end having arresting means concentric thereto for securing said stub, a plurality of chambers therein and a back end for joining to a section of piping;
   b. a connection ring having a pressure face, with a coaxial bore therethrough, opposed to said stub front end and external securing means concentric thereto for joining said union and a rear end for joining to a section of piping;
   c. means for centering and sealing comprising a rigid cylinder of predetermined circumference fitting inside one of said plurality of chambers with a flange around one end for exactly fitting inside another one of said plurality chambers and having a gasket of predetermined circumference surrounding said flange in the form of a spiral wound gasket seated in said another chamber and forming an hermetic seal at said union of said face and said front end; and
   d. locking means of predetermined circumference concentric to said stub for engaging said arresting means and said securing means simultaneously to maintain said gasket in hermetic sealing engagement with said face and front end and to coaxially join the sections of piping.

* * * * *

UNITED STATES PATENT OFFICE
CERTIFICATE OF CORRECTION

Patent No. 4,586,735          Dated May 6, 1986

Inventor(s) Donn Innes

It is certified that error appears in the above-identified patent and that said Letters Patent are hereby corrected as shown below:

Column 3, line 55, after "means", delete the word "so" and substitute --50-- therefor.

Signed and Sealed this

Second Day of September 1986

[SEAL]

Attest:

DONALD J. QUIGG

Attesting Officer      Commissioner of Patents and Trademarks